(12) United States Patent
Schulz

(10) Patent No.: US 10,668,398 B2
(45) Date of Patent: Jun. 2, 2020

(54) CURIOSITY REVEALING OR ANIMATING A SHAPED CAVITY

(71) Applicant: Joel Allen Schulz, Oklahoma City, OK (US)

(72) Inventor: Joel Allen Schulz, Oklahoma City, OK (US)

(*) Notice: Subject to any disclaimer, the term of this patent is extended or adjusted under 35 U.S.C. 154(b) by 0 days.

(21) Appl. No.: 16/174,885

(22) Filed: Oct. 30, 2018

(65) Prior Publication Data

US 2020/0129877 A1    Apr. 30, 2020

(51) Int. Cl.
| | |
|---|---|
| *A63H 33/00* | (2006.01) |
| *A63H 33/22* | (2006.01) |
| *A63H 33/26* | (2006.01) |
| *A63H 31/06* | (2006.01) |
| *A63H 31/04* | (2006.01) |
| *A63H 33/40* | (2006.01) |
| *F16H 55/17* | (2006.01) |
| *A63H 29/00* | (2006.01) |

(52) U.S. Cl.
CPC ............. *A63H 33/22* (2013.01); *A63H 31/04* (2013.01); *A63H 31/06* (2013.01); *A63H 33/26* (2013.01); *A63H 29/00* (2013.01); *A63H 33/40* (2013.01); *F16H 55/17* (2013.01)

(58) Field of Classification Search
CPC ........ A63H 29/00; A63H 29/04; A63H 29/10; A63H 29/14; A63H 29/16; A63H 29/22; A63H 29/24; A63H 31/00; A63H 31/04; A63H 31/06; A63H 31/08; A63H 33/042; A63H 33/046; A63H 33/40; A63H 33/26

USPC ...................... 446/90, 91, 103, 118, 125, 484
See application file for complete search history.

(56) References Cited

U.S. PATENT DOCUMENTS

| | | | | |
|---|---|---|---|---|
| 3,608,233 A | * | 9/1971 | Aoki ................... | A63H 33/042 446/90 |
| 3,881,274 A | * | 5/1975 | Kanda .................. | A63H 33/00 446/103 |
| 4,507,095 A | * | 3/1985 | Lin ...................... | A63H 33/042 446/118 |
| 4,950,197 A | * | 8/1990 | Dove .................... | A63H 33/00 434/401 |
| 4,983,890 A | * | 1/1991 | Satoh ................... | A63H 13/04 318/3 |
| 5,073,138 A | * | 12/1991 | Klitsner ................ | A63H 31/00 446/103 |
| 5,194,031 A | * | 3/1993 | Sahler .................. | A63H 31/00 446/103 |
| 5,259,803 A | * | 11/1993 | Lyman .................. | A63H 31/00 446/103 |
| 5,411,428 A | * | 5/1995 | Orii ..................... | A63H 33/042 446/102 |

(Continued)

*Primary Examiner* — Alexander R Niconovich
(74) *Attorney, Agent, or Firm* — Waidean A Schulz

(57) ABSTRACT

The present invention comprises two or more rotatable three-dimensional bodies and a linkage between the bodies. By means of the linkage, the rotation of a first body causes a second body to rotate. In at least one of the rotational positions of the two or more bodies, the shapes of the bodies are designed to create a shaped cavity between a first body and a second body. The shaped cavity may be a tunnel, or the shaped cavity may be a recess or niche. As the at least two bodies are rotated, the shaped cavity may appear or disappear or may change shape, position, or orientation as the bodies are rotated.

31 Claims, 11 Drawing Sheets

(56) References Cited

U.S. PATENT DOCUMENTS

| | | | | |
|---|---|---|---|---|
| 5,591,062 | A * | 1/1997 | Hettinger | A63B 67/086 446/240 |
| 5,779,515 | A * | 7/1998 | Chung | A63H 33/04 446/102 |
| 6,045,430 | A * | 4/2000 | How | A63H 13/00 40/414 |
| 6,157,872 | A * | 12/2000 | Michael | A63H 33/042 700/247 |
| 6,454,624 | B1 * | 9/2002 | Duff | A63H 33/042 446/91 |
| 6,561,866 | B1 * | 5/2003 | Lee | A63H 33/042 446/103 |
| 6,585,553 | B1 * | 7/2003 | Fetridge | A63H 33/042 446/91 |
| 6,682,392 | B2 * | 1/2004 | Chan | A63H 13/06 446/175 |
| 7,104,863 | B2 * | 9/2006 | Mimlitch, III | A63H 33/042 434/107 |
| 8,851,953 | B2 * | 10/2014 | Oschuetz | A63H 33/042 446/91 |
| 8,920,207 | B2 * | 12/2014 | Hageman | A63H 33/086 446/124 |
| 9,517,423 | B1 * | 12/2016 | Kanbar | A63H 33/042 |
| 9,661,944 | B2 * | 5/2017 | Wu | A47G 7/08 |
| 10,010,801 | B2 * | 7/2018 | Wang | G06F 3/017 |
| 10,124,269 | B2 * | 11/2018 | Uno | A63H 33/086 |
| 2017/0007939 | A1 * | 1/2017 | Choi | A63H 31/00 |
| 2018/0161687 | A1 * | 6/2018 | Naini | A63H 33/086 |

* cited by examiner

CURIOSITY REVEALING OR ANIMATING A SHAPED CAVITY

BACKGROUND OF INVENTION

This invention relates to a manipulable souvenir, novelty, or artwork which reveals or animates a shaped cavity, wherein the cavity reveals a symbol that communicates meaning to a user of the invention.

The object of this invention is to amuse the user by revealing a symbol or a message, in the form of a shaped cavity, where the symbol communicates a meaning to the user. This invention may also animate the shaped cavity.

SUMMARY OF THE INVENTION

The present invention comprises at least two rotatable, three-dimensional bodies, each having a rotational axis, and a physical linkage linking the bodies. Further, the physical linkage transfers torque from a rotation of a first body rotated through a first angle around the axis of the first body to a second body. The torque causes the second body to rotate through a corresponding second angle. The second angle of rotation of the second body around the axis of the second body corresponds to, but is not necessarily equal to, the angle of rotation of the first body around the axis of the first body. A combination of the rotation angle of the first body and the corresponding rotation angle of the second body constitute a rotational position.

There is a framework which confines the axis or each body and so holds the axes in fixed relationship to each other.

Further, in at least one of the rotational positions of the two or more bodies, the shapes of the bodies are designed to create a shaped cavity between the first body and the second body of the at least two bodies, wherein the shaped cavity has a surface that is a conjunction of a surface of the first body abutting with a surface of the second body. The abutting surfaces form a tunnel or "through-hole" having a surface which is a conjunction of the surfaces of the first and second bodies. The tunnel extends between and all the way past the first body and the second body of the at least two bodies, where the first body and second body are adjacent to each other. A cross-section of the tunnel is in a shape of an outline of a symbol, which communicates a meaning to a user of the invention when the first body and the second body occupy the rotational position at which the symbol is revealed.

Alternatively, the shaped cavity may be a recess or niche between the first and second bodies, which does not extend all the way past the first and second bodies. The surface of the recess is formed as a conjunction of a first surface of the first body abutting with a second surface of the second body. The recess ends at a closed rear portion of the surface of the cavity, which is a portion of the surface of at least one of the first and second bodies.

The shaped cavity may appear or disappear as the at least two bodies are rotated to different rotational positions; or the shaped cavity may change shape, size, relative position, or orientation as the at least two bodies are rotated to different rotational positions.

BRIEF DESCRIPTION OF THE SEVERAL VIEWS OF THE DRAWINGS

The accompanying drawings, which are incorporated herein and form a part of the specification, illustrate several embodiments of the present invention and, together with the description, serve to explain the principle of the invention.

In FIG. 1B the bodies have been rotated to a rotational position which reveals a shaped cavity in the shape of the letter 'I'.

In FIG. 1C the bodies have been rotated to a rotational position which reveals a shaped cavity in the shape of a heart, a symbol connoting love.

In FIG. 1D the bodies have been rotated to a rotational position which reveals a shaped cavity in the shape of the letter 'U', generally understood in English as a symbol meaning "you".

In FIG. 1E the bodies have been rotated to one of several intermediate rotational positions which reveal no shaped cavity between the bodies.

FIG. 2A also includes a dashed line to indicate where a planar cross-section is to be made, as shown in FIG. 2B.

FIG. 2B therefore shows only the bottom half of the star cavity.

In FIG. 5B the bodies have been rotated to a rotational position which reveals a shaped body in the shape of the letter 'I'.

In FIG. 5C the bodies have been rotated to a rotational position which reveals a shaped body in the shape of a heart symbol.

In FIG. 5D the bodies have been rotated to a rotational position which reveals a shaped body in the shape of the letter 'U'.

The parts shown in the various figures are numbered throughout as follows:
1a a first body
1b a second body
2 a shaped cavity (tunnel or recess)
3 a framework
6 a linkage (gear-like cogs, a flexible shaft, or a frictional contact)
7 a motor
9 a section plane

DETAILED DESCRIPTION OF SEVERAL EMBODIMENTS

The invention will be described below with reference to the figures and the numbered individual elements therein. In the description below, the specific construction, the count, and the arrangement of the components is intended for clarity of illustration and explanation. Other—perhaps better—arrangements of the components constitute alternative embodiments of the invention.

Figure 1A:
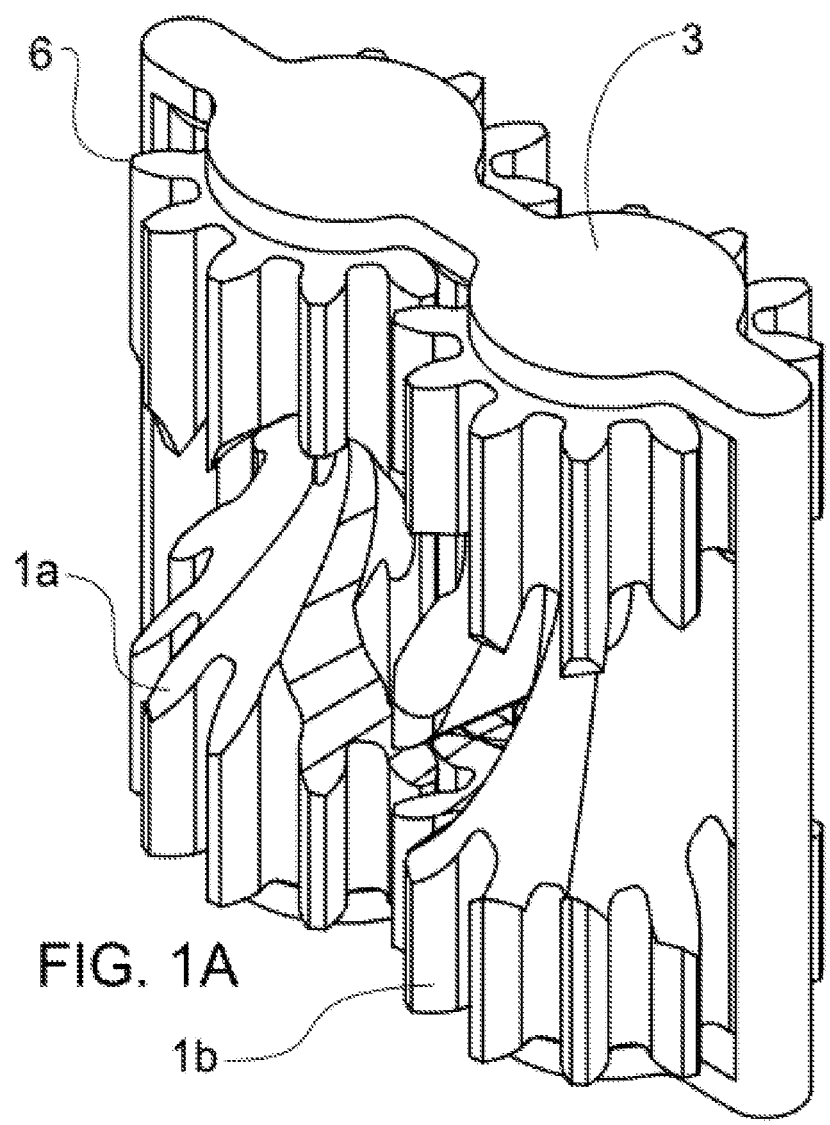
FIG. 1A is an oblique view of an embodiment of the invention which uses a plurality of intermeshing gear cogs, as a mechanical physical linkage, so that a rotation of the first body causes the second body to rotate.

The invention according to a preferred embodiment is shown in FIG. 1A. In this embodiment only two bodies 1a and 1b are shown. Other embodiments may have more bodies. The two bodies 1a and 1b in FIG. 1A have a plurality of intermeshing cogs as a means of linkage 6 so arranged that rotating a first body 1a around its axis will cause the other body 1b to also rotate about its axis. Each body 1a or 1b essentially is a cylindrical gear with at least one void cut out of the gear. In other embodiments, the bodies 1a and 1b could instead be hypoid gears, bevel gears, worm gears, irregular gears, or organic gears, each with specific voids cut out of their basic shape to produce a shaped cavity 2 in a certain rotational position. FIG. 1A also incorporates a framework 3 for confining the axes of the bodies 1a and 1b with respect to each other. The preferred embodiment would include a framework 3 in some form to ensure that the axes of bodies 1a and 1b are held in constant relationship to each other. The framework 3 may provide spindles or bearings for the bodies. However, an alternative embodiment might use magnetic attraction to hold the bodies 1a and 1b in contact with each other, where the magnetic field would be construed to be the framework 3. A framework 3 may further include a one-way clutch or a ratchet, which permits the bodies 1a and 1b to rotate in only one direction around their respective axes.

Figure 1B:
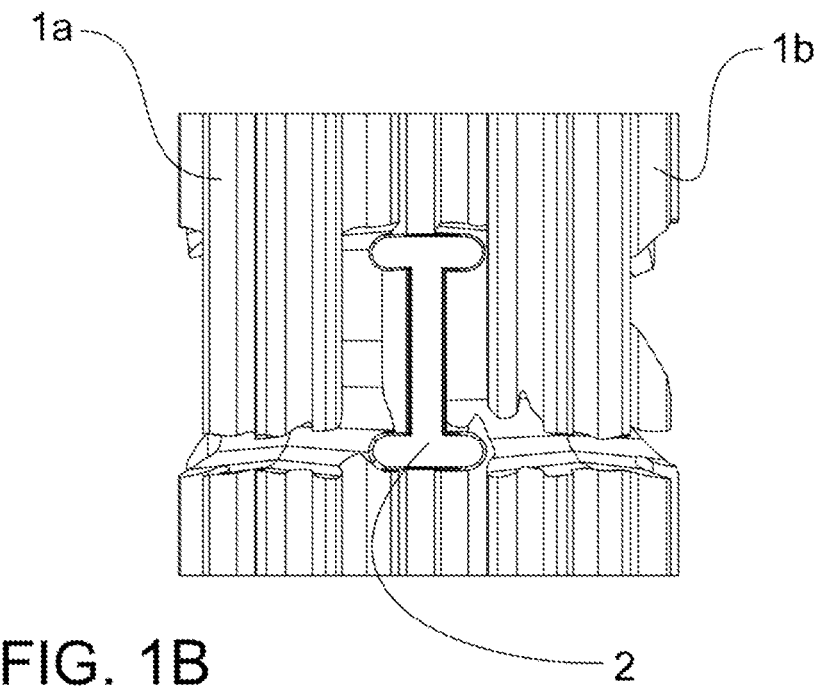
FIG. 1B is a frontal (or elevation) view of the embodiment shown in FIG. 1A.

FIG. 1B shows a frontal elevation view of the embodiment of FIG. 1A, but for simplicity the framework is not shown. In FIG. 1B the bodies 1a and 1b have been rotated about their respective axes to a particular rotational position, where surfaces of the two bodies 1a and 1b abut to form the surface of a shaped cavity 2, which is a tunnel having a cross-section in the shape of the alphabetic letter 'I'. In other embodiments, the shape of the shaped cavity 2 may be any other symbol meaningful to a user, such as any alphabetic letter, a numeral, a glyph, an emoji, or a logo. More precisely, a cross-section of the tunnel is shaped like the outline of the symbol. In the embodiment of FIG. 1B the shaped cavity 2 is a tunnel which passes all the way past and between both bodies 1.

Figure 1C:
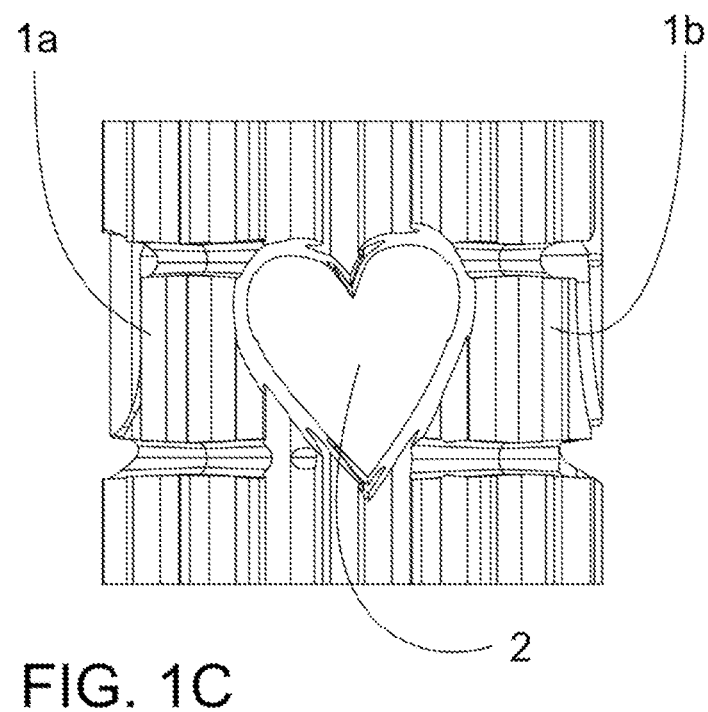
FIG. 1C is a frontal view of the embodiment shown in FIG. 1A.
Figure 1D:
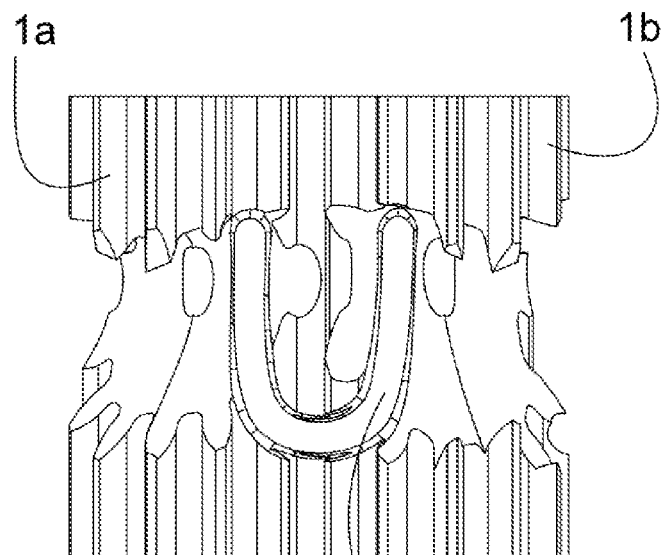
FIG. 1D is a frontal view of the embodiment shown in FIG. 1A.
Figure 1E:
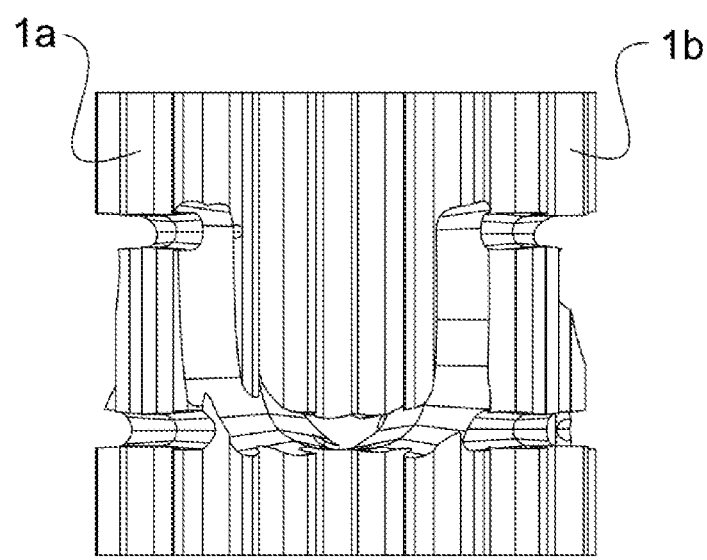
FIG. 1E is a frontal view of the embodiment shown in FIG. 1A.

FIG. 1B through FIG. 1E show a progression of rotational positions of the bodies 1a and 1b of the embodiment of FIG. 1A. In the simplest embodiment depicted, a body is rotated manually using fingers. As the gear-like bodies 1a and 1b rotate, a shaped cavity 2 with the shape of the alphabetic letter 'I' appears. As the bodies 1a and 1b are rotated further, for example by 60 degrees, it disappears. As the bodies 1a and 1b are rotated further a different shaped cavity 2 in the shape of a heart appears, as shown in FIG. 1C. As the bodies 1a and 1b are rotated even further, the cavity 2 shaped like a heart disappears. As the bodies 1a and 1b are rotated even further, the bodies form a cavity 2 shaped like the alphabetic letter 'U' appears, as shown in FIG. 1D. Upon further rotation of the bodies 1a and 1b, no shaped cavity appears, as shown in FIG. 1E. FIG. 1E shows one of many rotational positions of the bodies 1a and 1b at which no shaped cavity is to be seen. Even if there is an incidental, intermediate cavity which appears while rotating the bodies between the positions shown in FIG. 1B through FIG. 1D, the cavity does not reveal or manifest any common, well-known, recognizable symbol meaningful to a user of the invention. The shaped cavities 2 of FIG. 1B through FIG. 1D are formed when a first surface in a first body 1a abuts with a second surface in a second body 1b, such that a conjunction of the first and second surfaces forms a surface surrounding the shaped cavity 2. In practice, a negligible air gap or crack may exist at a junction between the abutting surfaces of the two bodies when the cavity 2 reveals the symbol, because the two bodies are still unbonded, individual bodies. The width of the gap between the surfaces would be too small to detract from recognition of the embodied symbol.

FIG. 1B through FIG. 1D illustrate a particular sequence of three cavities 2, which convey the message "I love you", in this case embodied by three sequential, symbol-shaped cavities, meaningful to a user. There is an unlimited number of other symbols, which could be used instead of these particular symbols of the preferred embodiment of FIG. 1A. The invention does not require that there be three differently shaped cavities 2; there could be more or could be fewer. The invention does not require that a sequence of such shapes convey a message, as in FIG. 1B through FIG. 1D. For example, alternative shapes of the bodies 1a and 1b, could sequentially display and then hide one or more shaped cavities 2 meaningful to a child-such as outline shapes of a truck, a dinosaur, a rocket ship, or any other such commonly recognizable symbol.

Figure 2A:
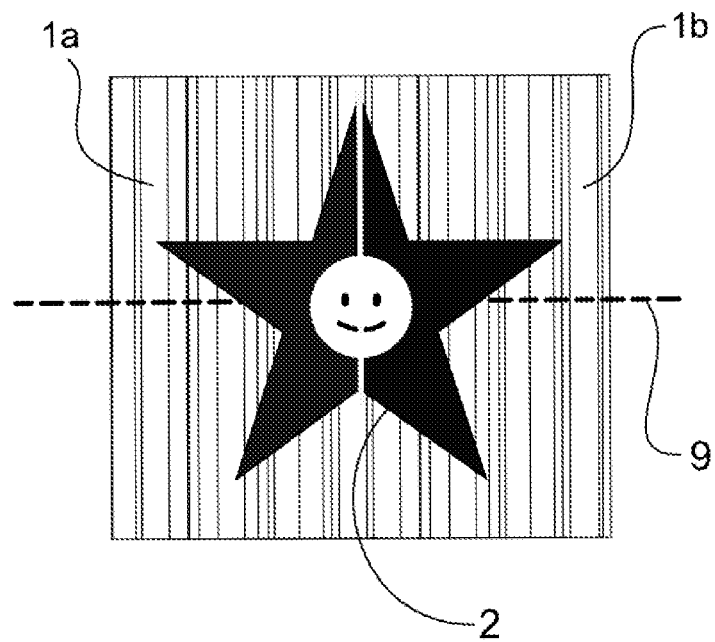
FIG. 2A is a frontal view of an embodiment of the invention which also uses a plurality of intermeshing gear cogs as the linkage between the bodies. For clarity, the frame is not shown. The two bodies are rotated to a rotational position to reveal the shape of a star formed by a cavity, which is a recess ending at the star.

FIG. 2A shows a frontal view, where the bodies 1a and 1b again essentially are two gears. For clarity, a framework is not shown. FIG. 2A shows a shaped cavity 2, which does not extend past the bodies 1a and 1b. Rather, the shaped cavity 2 is a recess that extends only part-way between the bodies 1a and 1b. The shaped cavity 2 in this case is the shape of a star, but an alternate embodiment might reveal a recess of some other shape, such as the outline of an alphabetic letter, a numeral, or a glyph. The rear surface of the recess is a portion of the surface of at least one of the bodies 1a or 1b, and the rear surface may have a color contrasting with the color of the rest of the bodies 1a and 1b. The color is simply shown as black in FIG. 2A, but the color can be any visible color. Further, the cavity 2, which in FIG. 2A is a recess, also contains a graphic image at the rear of the recess. Other images, glyphs, text, or a combination thereof could instead be imprinted on the rear surface of the shaped cavity 2.

Further, the rear surface may include a mirror. Still further, the rear surface need not be planar but could reveal a symbol in relief.

Figure 2B:
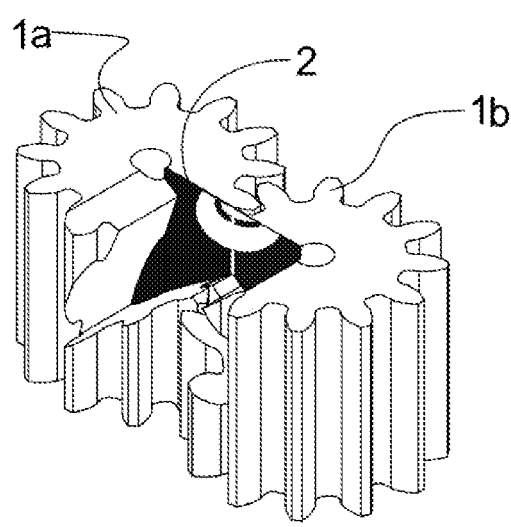
FIG. 2B is an oblique view of the embodiment of FIG. 2A, except that the top halves of the two bodies are shown removed above the dashed section line of FIG. 2A.

FIG. 2A also shows a dotted line indicating the edge view of a section plane 9. FIG. 2B shows an oblique view of the embodiment shown in FIG. 2A but with the top halves of the gear-like bodies 1a and 1b removed from above the cutting plane. FIG. 2B illustrates that the cavity 2 extends only halfway through the bodies 1a and 1b in the rotational position that produces the star-shaped shaped cavity 2. In variations of the embodiment shown in FIG. 2A and FIG. 2B, the cavity may extend deeper or extend less deep.

Figure 3:
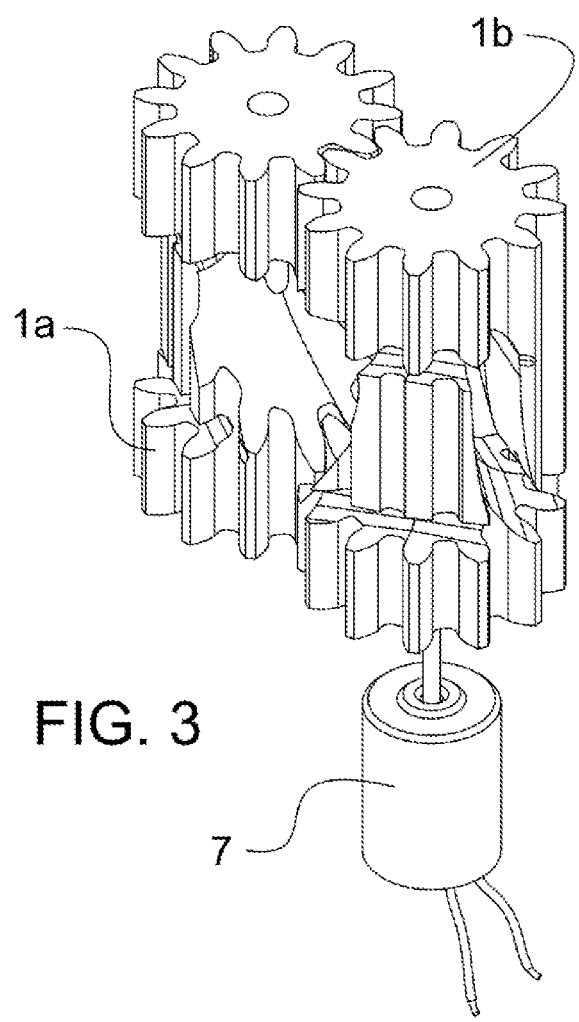
FIG. 3 is an oblique view of the embodiment of FIG. 1A but includes a motor, which directly causes the rotation of the first body and therefore indirectly causes the rotation of the second body, because the mechanical gear cogs provide a physical linkage between the bodies.

FIG. 3 is an oblique drawing of the embodiment of FIG. 1A but with the addition of an electric motor 7 to rotate one body 1b. The other body 1a will therefore also turn, because of the linkage between the bodies 1a and 1b, which, as in the case of FIG. 1A, is the plurality of intermeshing cogs 6 of the bodies 1a and 1b. FIG. 3 illustrates only one means for rotating the bodies 1a and 1b about their axes without a user having to manually rotate them. Other means for automating the rotation of the bodies 1a and 1b could be a turbine powered by running water, a turbine powered by wind, a wind-up spring motor, squirrel cage, or any other such power source of mechanical rotation. A more basic embodiment of the current invention could use a means such as a crank, a wheel, or a knob to manually rotate a body 1a or 1b. Even more basic would be for the user to simply rotate a body 1a and 1b directly by manually rotating one of the bodies 1a or 1b with fingers.

Figure 4A:
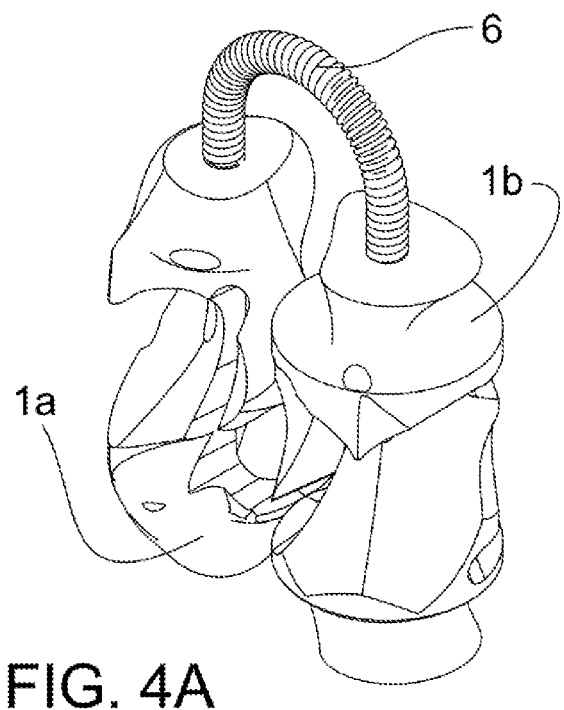
FIG. 4A is an oblique view of two bodies, which are linked by a flexible shaft as the physical linkage, such that when the first body is rotated, the second body also rotates.

FIG. 4A is an oblique drawing of an alternative embodiment of the invention. Once again, for clarity the framework 3 is not shown. FIG. 4A shows two bodies 1a and 1b, which are not gears or gear-like. Each body 1a and 1b has specific voids cut out of an original cylindrical body. Alternatively, the bodies 1a and 1b could be multiple-sided prisms with voids, for example, or other three-dimensional shapes. In the embodiment of FIG. 4A the linkage 6 between the two bodies 1 is a flexible shaft, which causes one body 1a to rotate if the other body 1b is rotated. Yet other potential means of linkage among the bodies are the use of magnets or synchronous motors, for example.

Figure 4B:
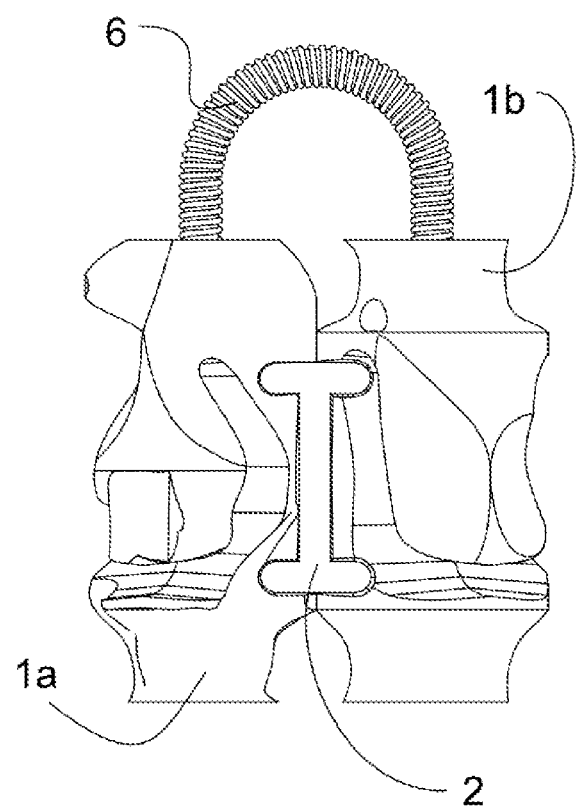
FIG. 4B is a frontal view of the embodiment of FIG. 4A, where the bodies have been rotated to a rotational position which reveals a shaped cavity in the shape of the letter 'I'.
Figure 4C:
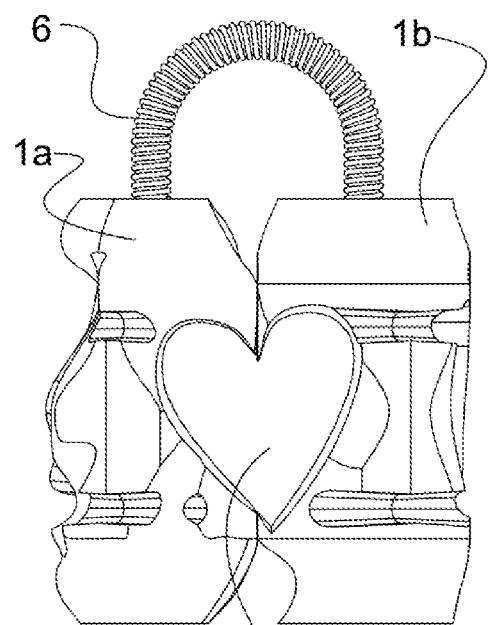
FIG. 4C and FIG. 4D are frontal views of the embodiment of FIG. 4A, where the bodies have been rotated to rotational positions that respectively reveal shaped cavities in the shapes of a heart and the letter 'U'.
Figure 4D:
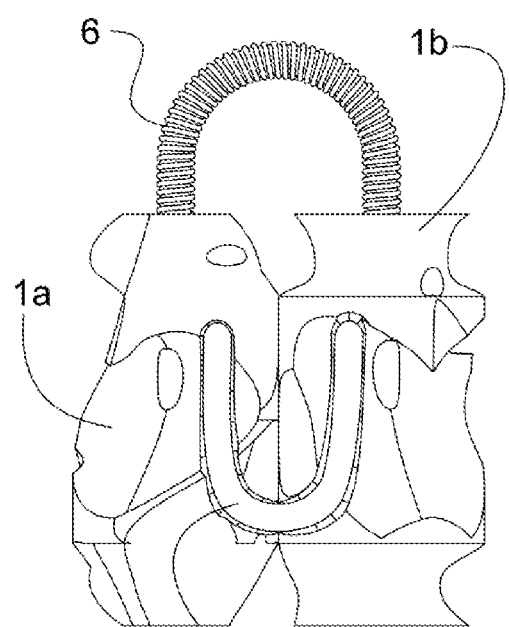

FIG. 4B is a frontal elevation view drawing of the embodiment of FIG. 4A. The bodies 1a and 1b are shown rotated to a specific rotational position which causes the voids of both bodies 1a and 1b to form a cavity 2 in the shape of the letter 'I'. FIG. 4C and FIG. 4D are also frontal elevation view drawings of the embodiment of FIG. 4A, except that the bodies 1a and 1b are rotated to two specific rotational positions, which respectively reveal a heart-shaped cavity 2 and a letter U-shaped cavity 2. The cavities 2 shown in FIG. 4A through FIG. 4D may be through-hole (tunnel) cavities as in FIG. 1A through FIG. 1E. Alternatively, the cavities 2 of the embodiment of FIG. 4A through FIG. 4D need not extend all the way past the bodies 1a and 1b, as was shown in FIG. 2A and FIG. 2B.

Figure 5A:
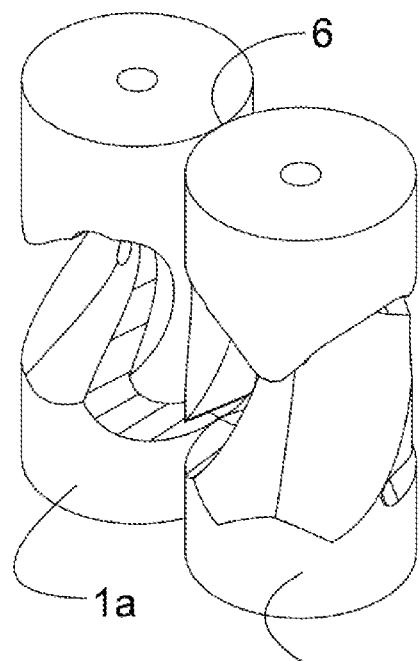
FIG. 5A is an oblique view of an embodiment of the invention which uses two rollers with sufficient frictional contact so that a rotation of the first body causes the second body to rotate.

FIG. 5A is an oblique view drawing of two bodies 1a and 1b in another embodiment of the invention, where at least a portion of one body 1a is in frictional contact with a portion of the other body 1b, at each rotational position of the bodies 1a and 1b. The mechanical linkage 6 between the bodies 1a and 1b is simply the frictional contact between them. Therefore, as one of the bodies 1a is rotated, the other body 1b is rotated, or as body 1b is rotated body 1a is rotated. The simplest form of this embodiment would use the same constant distance (radius) to the frictional contact point 6 from the axis of each body 1a or 1b. That is, each body 1a or 1b essentially is a circular cylinder but with a void cut out of it. An embodiment need not use the same radius for each cylindrical body 1a or 1b. For example, the radius of body 1b might be twice the radius of body 1a. Further, the frictional contact point 6 need not be at a constant radius as the bodies 1a and 1b rotate. For example, the bodies 1a and 1b could be elliptical cylinders (each with voids cut out of them) so arranged that both bodies 1a and 1b always are in frictional contact.

Figure 5B:
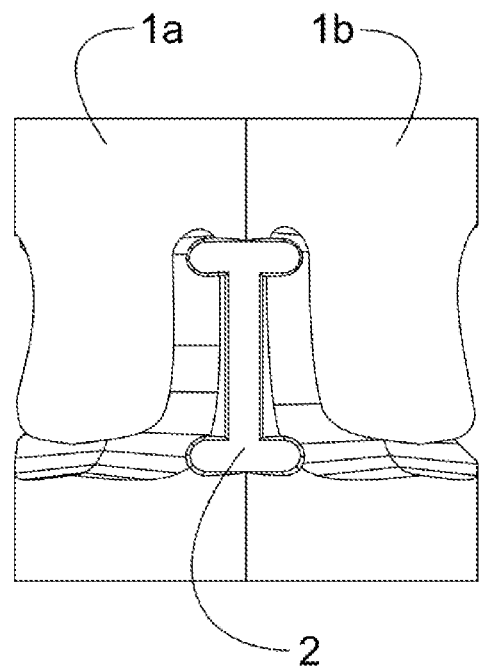
FIG. 5B is a frontal view of the embodiment shown in FIG. 5A.
Figure 5C:
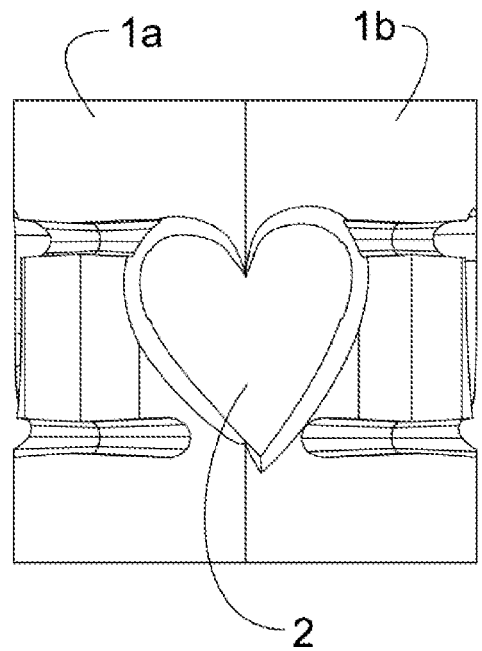
FIG. 5C is a frontal view of the embodiment shown in FIG. 5A.
Figure 5D:
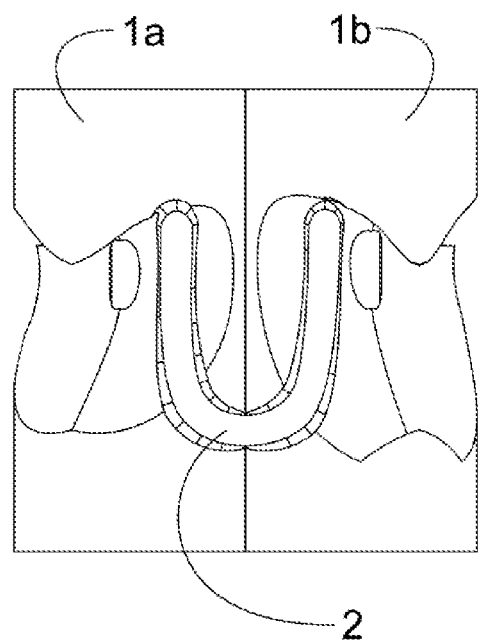
FIG. 5D is a frontal view of the embodiment shown in FIG. 5A.

FIG. 5B through FIG. 5D are frontal elevation views of the embodiment of FIG. 5A and show a series of rotational positions at which the bodies 1a and 1b form shaped cavities. Once again, for clarity the framework 3 is not shown. As with FIG. 1A through FIG. 1D, the shape of the cavities may reveal any arbitrary but recognizable outline of a symbol, selected from a set comprising numerals, alphabetic letters, emojis, or glyphs. The number of shaped cavities revealing a symbol upon rotation to specific rotation angles could be just one or could be more.

Figure 6A:
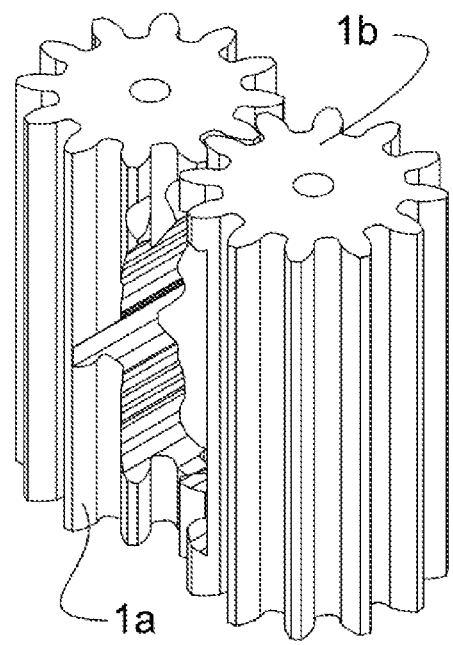
FIG. 6A is an oblique view of another embodiment, in which the shaped cavity is a recess with the shape of a face profile.
Figure 6B:
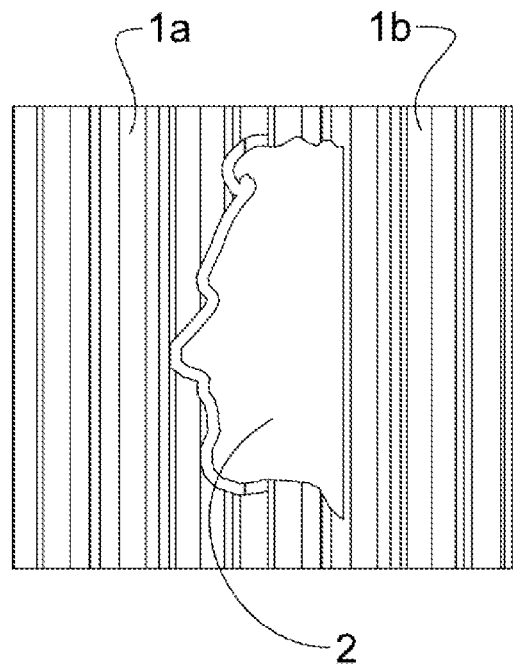
FIG. 6B is a frontal view of the embodiment shown in FIG. 6A more clearly showing the recess with the shape of the profile of the face.

FIG. 6A is an oblique view drawing of a variation of the preferred embodiment of the present invention shown in FIG. 1A, which used gear-like cogs as the linkage 6 between the bodies 1a and 1b. FIG. 6B is frontal (elevation) view corresponding to the oblique view of FIG. 6A and more clearly shows that the cavity 2 is a recess in the shape of a profile of a person's face. The person's profile could be that of a famous person or a custom profile of a spouse of the user, for example. The rear surface of the recess may even be a photographic profile image of the person. The recessed cavity 2 may alternatively be a profile of an animal or a flower, for example. In the embodiment of FIG. 6A and FIG. 6B, the cavity 2 is the only shaped cavity which the embodiment reveals. Note that in this case part of the face projects outward from body 1b, so the recessed face is a combination of a void in body 1b and a projecting part of body 1b.

Figure 7A:
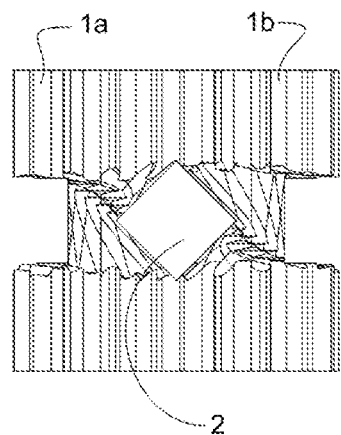
FIG. 7A through 7C are frontal views of an embodiment which show several snapshots of an animated sequence of changes in the orientation of the shaped cavity, which is a square.
Figure 7B:
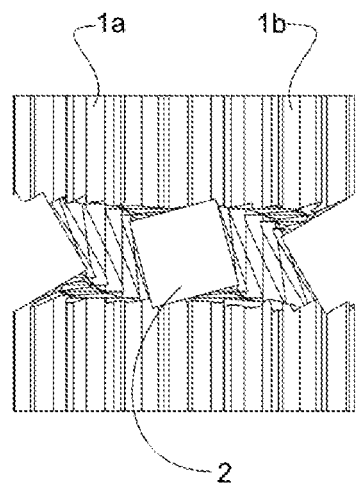
Figure 7C:
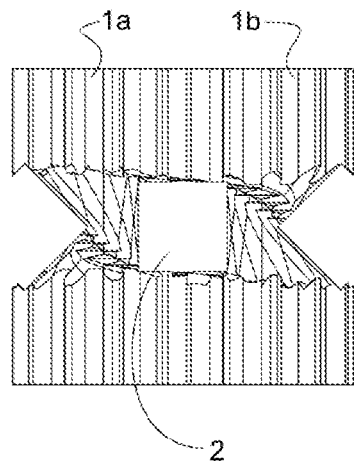

FIG. 7A through FIG. 7C are three elevation views of two bodies 1a and 1b, which are all frontal views of the same embodiment and which here are depicted as intermeshing gears with voids cut out. Again, for clarity, the framework 3 is not shown. FIG. 7A through FIG. 7C simply show the bodies 1a and 1b rotated to three rotational positions, which form an animated square cavity 2 that rotates in orientation as the bodies 1 are rotated. Instead of a square cavity 2, as used as an example in FIG. 7A through FIG. 7C, some other shape could be used in an embodiment of this invention. Further, instead of, or in addition to, changing orientation, the cavity 2 could change relative position, size, or shape.

In a preferred embodiment, when the symbol is revealed, the symbol would be viewable from a plurality of directions. If the axes of the first body 1a and the second body 1b are parallel, then an optimum viewing direction would be along a line perpendicular to a plane containing the axes of the bodies 1a and 1b with the line passing through a point within the cavity and therefore within the symbol. The plurality of viewing directions would be within at least 20 degrees from the optimum viewing direction.

In a preferred embodiment in which the axes of the bodies 1a and 1b are not parallel, there exists a cone of at least 30 degrees containing the plurality of directions to view the symbol when it is revealed, where the cone is circular, is fixed relative to the two axes, and has centerline passing through a point within the cavity and therefore within the symbol. Herein the cone's angle is measured between sides opposite each other across the cone.

In some embodiments of this apparatus, a sound source may be actuated, or a light may be actuated at a predetermined rotational angle of a first body of the two or more bodies. The light may further comprise a light-emitting diode, a battery, and a switch. The sound source may comprise a bell or a battery-powered buzzer, for example. Alternatively, the sound source or light source may be actuated simply when the bodies rotate. Further, the light may be on constantly, such as providing the invention as a night light, or the sound may be a music box which also rotates the bodies.

While this invention is described above with reference to several embodiments, anyone skilled in the art can readily visualize further, alternative embodiments of this invention. Therefore, the scope and content of this invention are not limited by the foregoing description. Rather, the scope and content are to be defined by the following claims.

I claim:

1. An apparatus for revealing or animating a shaped cavity, said cavity revealing a symbol to a user of the apparatus, comprising:
    two or more bodies, each of which are three-dimensional and rotatable, wherein each body has a rotation axis, and each body can be rotated to a multiplicity of rotational positions;
    a physical linkage between at least two bodies of the two or more bodies that transfers a torque from a rotation of a first body to a second body, and the torque produces a rotation of the second body;
    a framework that confines the rotation axes of the two or more bodies in fixed relationship to each other;
    wherein at least the first body and the second body are adjacent, and the first body and second body are shaped to produce the shaped cavity and to reveal the symbol in a rotational position of the first body and second body;
    wherein the shaped cavity is a conjunction of a surface of the first body abutting with a surface of the second body;
    and wherein the symbol communicates a meaning to the user when the first body and the second body occupy the rotational position at which the shaped body reveals the symbol to the user.

2. The apparatus of claim 1, wherein the rotation axes of the first body and the second body are parallel; wherein there is a plurality of viewing directions from which the symbol can be seen by the user when the symbol is revealed; and wherein each viewing direction of the plurality of viewing directions is within an angle of 20 degrees from a line that is perpendicular to a plane containing both of the rotation axes and that passes through a point within the shaped cavity.

3. The apparatus of claim 1, wherein the rotation axes of the first body and the second body are not all parallel; wherein there exists a cone of at least 30 degrees containing a plurality of points from which to view the symbol when it is revealed; and wherein the cone is circular, is fixed relative to the two rotation axes, and has an axis passing through a point within the shaped cavity.

4. The apparatus of claim 1, wherein the physical linkage is a flexible shaft connected between two bodies of the two or more bodies.

5. The apparatus of claim 1, wherein the physical linkage is a belt which snugly wraps around at least two of the two or more bodies.

6. The apparatus of claim 1, wherein the physical linkage is a continuous friction contact between the first body and the second body.

7. The apparatus of claim 1, wherein the physical linkage is provided by a magnet fixedly part of each of at least two of the two or more bodies.

8. The apparatus of claim 1, wherein each of at least two of the two or more bodies further comprises a plurality of cogs, such that the plurality of cogs of a first body intermesh with a plurality of cogs of a second body.

9. The apparatus of claim 8, wherein a part of each of the first and second bodies comprises a gear.

10. The apparatus of claim 9, wherein each gear is a gear in a set comprising a cylindrical gear, a bevel gear, a worm gear, a hypoid gear, and an irregular gear.

11. The apparatus of claim 1, wherein the framework provides a spindle around which at least one of the two or more bodies rotates.

12. The apparatus of claim 1, wherein the framework provides a bearing on which at least one of the two or more bodies rotates.

13. The apparatus of claim 1, wherein the symbol is in a set comprising alphabetic letters, numerals, emojis, and glyphs.

14. The apparatus of claim 1, wherein the shaped cavity is a tunnel passing past and between two bodies that are adjacent.

15. The apparatus of claim 1, wherein the shaped cavity is a recess that ends at a rear closed portion of the surface of the recess, and the rear closed portion is a portion of the surface of at least one of the first and second bodies.

16. The apparatus of claim 15, wherein the rear closed portion of the recess displays a graphical image.

17. The apparatus of claim 15, wherein the rear closed portion of the recess is colored differently from the rest of the first and second bodies forming the shaped cavity.

18. The apparatus of claim 1, wherein the shaped cavity alternatively appears and disappears as the first and second bodies rotate.

19. The apparatus of claim 1, wherein the shaped cavity changes in size as the first and second bodies rotate.

20. The apparatus of claim 1, wherein the shaped cavity changes shape as the first and second bodies rotate.

21. The apparatus of claim 1, wherein the shaped cavity changes position as the first and second bodies rotate.

22. The apparatus of claim 1, wherein at least one body of the two or more bodies is rotated manually.

23. The apparatus of claim 1, wherein at least one body of the two or more bodies is rotated by a power source.

24. The apparatus of claim 23, wherein the power source is an electric motor.

25. The apparatus of claim 23, wherein the power source is a wind-up, spring driven motor.

26. The apparatus of claim 23, wherein the power source is a wind turbine.

27. The apparatus of claim 23, wherein the power source is a water turbine.

28. The apparatus of claim 1, further comprising a light that is actuated when the first body rotates to a predefined position.

29. The apparatus of claim 1, further comprising a light that is actuated when the first and second bodies rotate.

30. The apparatus of claim 1, further comprising a sound source that is actuated when the first and second bodies rotate to a predefined position.

31. The apparatus of claim 1, further comprising a sound source that is actuated when the first and second bodies rotate.

* * * * *